(12) United States Patent
Zhang et al.

(10) Patent No.: US 9,465,125 B2
(45) Date of Patent: Oct. 11, 2016

(54) SEISMIC DATA PROCESSING INCLUDING COMPENSATING FOR SOURCE AND RECEIVER GHOST EFFECTS IN REVERSE TIME MIGRATION

(71) Applicant: CGGVERITAS SERVICES SA, Massy (FR)

(72) Inventors: Yu Zhang, Katy, TX (US); Graham Roberts, Forest Row (GB); Lian Duan, Crawley (GB)

(73) Assignee: CGG SERVICES SA, Massy (FR)

( * ) Notice: Subject to any disclaimer, the term of this patent is extended or adjusted under 35 U.S.C. 154(b) by 813 days.

(21) Appl. No.: 13/859,807

(22) Filed: Apr. 10, 2013

(65) Prior Publication Data

US 2013/0343154 A1   Dec. 26, 2013

Related U.S. Application Data

(60) Provisional application No. 61/635,379, filed on Apr. 19, 2012.

(51) Int. Cl.
| | | |
|---|---|---|
| *G01V 1/38* | (2006.01) | |
| *G01V 1/36* | (2006.01) | |
| *G01V 1/37* | (2006.01) | |

(52) U.S. Cl.
CPC ............. *G01V 1/36* (2013.01); *G01V 1/366* (2013.01); *G01V 1/375* (2013.01); *G01V 1/38* (2013.01); *G01V 2210/679* (2013.01)

(58) Field of Classification Search
CPC .......... G01V 1/36; G01V 1/38; G01V 1/366; G01V 1/375; G01V 2210/679

USPC ...................................................... 367/24, 50
See application file for complete search history.

(56) References Cited

U.S. PATENT DOCUMENTS

| | | | |
|---|---|---|---|
| 2010/0183198 A1* | 7/2010 | Marmal Yevskyy | .... G01V 1/28 382/109 |
| 2011/0176384 A1 | 7/2011 | Soubaras | |
| 2011/0310699 A1 | 12/2011 | Robertsson et al. | |
| 2011/0317519 A1 | 12/2011 | Liu | |

FOREIGN PATENT DOCUMENTS

| | | |
|---|---|---|
| GB | 2477031 A | 7/2011 |
| WO | 99/56153 | 11/1999 |
| WO | 2010/053657 A2 | 5/2010 |

OTHER PUBLICATIONS

Liu et al. "Reverse Time Migration of Multiples", Society of Exploration Geophysicists, 2011 SEG meeting, 9/18-23, San Antonio , Texas.*

(Continued)

*Primary Examiner* — Ian J Lobo
(74) *Attorney, Agent, or Firm* — Patent Portfolio Builders PLLC

(57) ABSTRACT

Methods and systems for compensating for source and receiver ghost effects in a reverse time migration (RTM) equation are described. Boundary conditions associated with the RTM acoustic wave equations for the source and recorded wavefields are modified. The resultant modified RTM acoustic wave equations are solved to generate ghost compensated modeled seismic images. In another aspect an imaging condition is also modified and the resultant RTM acoustic wave equations are solved to generate velocity and impedance perturbation images.

20 Claims, 11 Drawing Sheets

(56) References Cited

OTHER PUBLICATIONS

Danish Patent and Trademark Office Singapore Search Report mailed May 9, 2014, in related Singapore Patent Application No. 201302876-6 (5 of the cited documents were previously provided with the IDS filed Nov. 18, 2013).
Danish Patent and Trademark Office Singapore Written Opinion mailed May 9, 2014, in related Singapore Patent Application No. 201302876-6.
UK Search Report dated Oct. 24, 2013, in related British Application No. GB1307126.1.
Robert Soubaras, "Deghosting by joint deconvolution of a migration and a mirror migration", 81st Annual International Meeting, SEG, 2010, Expanded Abstracts, pp. 3406-3410.
Robert Soubaras et al., "Variable-depth streamer acquisition: broadband data for imaging and inversion", 81st Annual International Meeting, SEG, 2011, Expanded Abstracts, pp. 2364-2368.
Robert Soubaras et al., "Variable Depth Streamer—The New Broadband Acquisition System", 81st Annual International Meeting, SEG, 2011, Expanded Abstracts, pp. 4349-4353.
Sheng Xu et al., "3D angle gathers from reverse time migration", Geophysics, Mar.-Apr. 2011, vol. 76, No. 2, pp. S77-S92.
Yu Zhang et al., "Practical issues of reverse time migration: true amplitude gathers, noise removal and harmonic-source encoding", CPS/SEG Beijing 2009 International Geophysical Conference & Exposition.
Singapore Search and Examination Report in corresponding Application No. 2013028766 dated Dec. 19, 2014.

\* cited by examiner

SEISMIC DATA PROCESSING INCLUDING COMPENSATING FOR SOURCE AND RECEIVER GHOST EFFECTS IN REVERSE TIME MIGRATION

RELATED APPLICATION

The present application is related to, and claims priority from U.S. Provisional Patent Application No. 61/635,379, filed Apr. 19, 2012, entitled "Compensating for Source and Receiver Ghost Effects in Reverse Time Migration," to Yu Zhang, Graham Roberts and Lian Duan, the disclosure of which is incorporated herein by reference.

TECHNICAL FIELD

Embodiments of the subject matter disclosed herein generally relate to methods and systems for seismic data processing and, more particularly, to mechanisms and techniques for enhancing Reverse Time Migration by compensating for source and receiver ghost effects.

BACKGROUND

For marine seismic data, the source and receiver ghosts generated by the free surface cause angle dependent frequency and amplitude distortion. For improved interpretation and inversion, these unwanted effects are best corrected in a pre-stack depth image.

Interpreting subtle geologic features in a marine environment requires the associated seismic data to contain both low and high frequencies necessary for high resolution imaging. In general, high-fidelity, low frequency data provides greater penetration of the underlying strata and an associated better illumination of deep targets in addition to providing greater stability and information more important for seismic inversion. Accordingly, it is preferable to obtain a wide bandwidth seismic image.

Achieving wide bandwidth pre-stack depth images from marine seismic data requires overcoming bandwidth limitations imposed by source and receiver ghosts. Recently, many attempts have been made to compensate for source and receiver ghosts such as variable-depth streamer acquisition as described by R. Soubaras and P. Whiting (hereinafter "Soubaras/Whiting") in their 2011 article entitled "Variable Depth Streamer—The New Broadband Acquisition System," published in the 81st Annual International Meeting, SEG, Expanded Abstracts, pages 4349-4353 and incorporated herein by reference. They proposed to take advantage of the low noise response of new generation solid streamers and the notch diversity caused by receiver depth variation to give a high quality broadband spectrum.

Continuing with suitable broadband spectrums, the receiver ghosts can be removed in a later processing stage by processing and imaging techniques as described by R. Soubaras (hereinafter "Soubaras") in his 2010 article entitled "Deghosting by Joint Deconvolution of a Migration and a Mirror Migration," published in the 81st Annual International Meeting, SEG, Expanded Abstracts, pages 3406-3410, incorporated herein by reference and by R. Soubaras and Y. Lafet in their 2011 article entitled "Variable Depth Streamer Acquisition: Broadband Data for Imaging and Inversion," published in the 81st Annual International Meeting, SEG, Expanded Abstracts, pages 2364-2368 and incorporated herein by reference. The aforementioned techniques generate an exceptionally sharp and clean wavelet for interpretation with respect to receiver ghosts.

However, removing the source ghosts remains a more difficult task based on the assumption that the sources are excited at a roughly fixed depth, i.e., lack of notch diversity, and with a large shot increment in lateral positions, i.e., severe data aliasing, as generally happens in marine tow-streamer surveys. Further, the existence of ghosts distorts both the migration spectrum and the amplitude versus angle (AVA) relation.

Accordingly, it would be desirable to provide systems and methods that avoid the afore-described problems and drawbacks, and provide compensation for both source and receiver ghosts in a wide bandwidth seismic dataset.

SUMMARY

According to an exemplary embodiment, a method, stored in a memory and executing on a processor, for compensating for ghosts in a computed seismic image based on a reverse time migration (RTM) of a seismic dataset associated with one or more seismic sources and one or more seismic receivers comprises modifying a first boundary condition of a first RTM acoustic wave equation associated with a source wavefield; modifying a second boundary condition of a second RTM acoustic wave equation associated with a recorded wavefield; solving the first RTM acoustic wave equation and the second RTM acoustic wave equation and generating a ghost compensated computed seismic image; and outputting the ghost compensated computed seismic image.

A node for compensating for ghosts in seismic image data based on a Reverse Time Migration (RTM) comprises a seismic dataset; one or more processors configured to execute computer instructions and a memory configured to store said computer instructions wherein said computer instructions further comprising a boundary condition component for modifying boundary conditions associated with RTM acoustic wave equations; an engine component for solving the RTM acoustic wave equations configured with modified boundary conditions and generating a ghost compensated computed seismic image; and an output component for outputting the ghost compensated computed seismic image.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of compensating for source and receiver ghost effects in reverse time migration. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
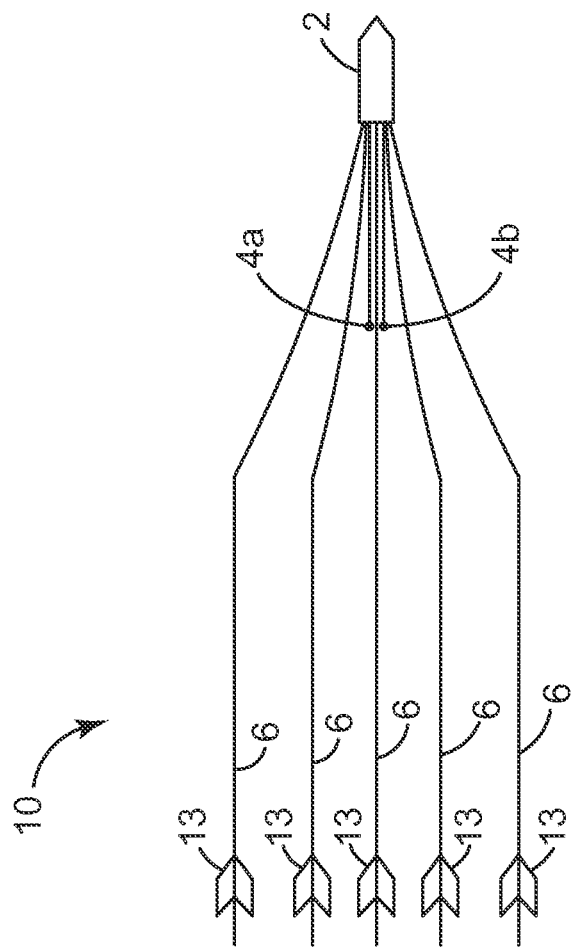
FIGS. 1 and 2 show various aspects of a marine seismic survey system in which embodiments for generating a ghost compensated computed seismic image can be implemented.

In order to provide some context for the subsequent embodiments related to the collection of seismic data, the removal of source and/or receiver ghosts and the generation of seismic illumination maps, consider first a seismic data acquisition process and system as will now be described with respect to FIGS. 1 and 2. In FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2.

One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. The seismic waves then reflect off of the free surface, i.e., the surface of the body of water (see FIG. 2, discussed below), traveling downward and are once again detected by receivers 14 provided on streamers 6 as receiver ghosts. This process is generally referred to as "shooting" a particular seafloor area, with the seafloor area referred to as a "cell" and the sea surface referred to as a "free surface."

Figure 2:
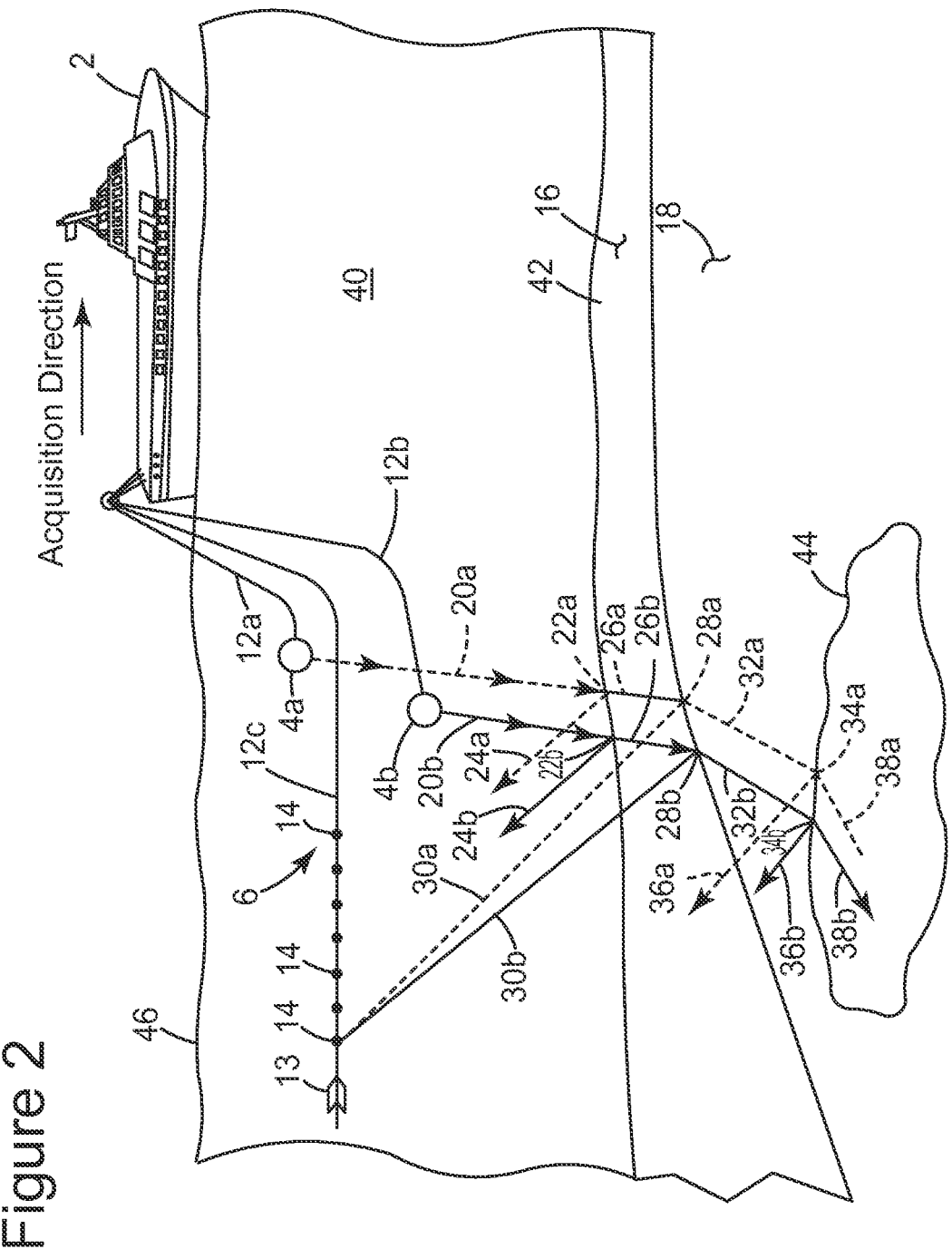

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the many principles involved, only a first transmitted signal 20a will be shown (even though some or all of sources 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples (or ghosts). A surface multiple signal is one such example of a multiple, however there are other ways for multiples to be generated. For example, reflections from the free surface can travel back down to the receivers and be recorded as ghosts. Multiples (and ghosts) do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

Once collected, seismic data is processed to generate images which can be used by those skilled in the art to identify subsurface features. The processing of seismic data can include the application of many different techniques to the dataset. For example with respect to ghosts, first, assume a source depth denoted by $\Delta z_s$ and an acoustic wave speed of water denoted by $v_0$. The source ghost generated by the free surface reflection is an angle dependent effect, which changes both the wavelet amplitude and the spectrum. As a simplification, assume the surface reflectivity is −1. At the source location, the source ghost $G_s$ acting on the seismic wavefield with a propagation angle $\alpha_s$ takes a form in the frequency domain as:

$$G_s(\omega, \alpha_s) = e^{-i\frac{\omega \cos\alpha_s \Delta z_s}{v_0}} - e^{i\frac{\omega \cos\alpha_s \Delta z_s}{v_0}} \qquad (1)$$
$$= -2i\sin\frac{\omega \cos\alpha_s \Delta z_s}{v_0}$$

Further, in the frequency and wave number domain a relationship exists as:

$$\cos\alpha_s = \sqrt{1 - \frac{v_0^2}{\omega^2}(k_x^2 + k_y^2)} \quad (2)$$

where $k_x$ and $k_y$ are the horizontal spatial wavenumbers in the x and y direction respectively. Similarly, the receiver ghost can be expressed as:

$$G_r(\omega, \alpha_r) = e^{-i\frac{\omega\cos\alpha_r \Delta z_r}{v_0}} - e^{i\frac{\omega\cos\alpha_r \Delta z_r}{v_0}} \quad (3)$$

$$= -2i\sin\frac{\omega\cos\alpha_r \Delta z_r}{v_0}.$$

The theory and implementation of true Reverse Time Migration (RTM) has been developed and presented by both Y. Zhang and J. Sun in their 2009 article entitled "Practical Issues of Reverse Time Migration: True-Amplitude Gathers, Noise Removal and Harmonic-Source Encoding," published in First Break, Vol. 26, pages 19-25, incorporated herein by reference and S. Xu, Y. Zhang and B. Tang (hereinafter "XU et. al.") in their 2011 article entitled "3D Angle Gathers from Reverse Time Migration," published in Geophysics, Vol. 76, No. 2, pages S77-S92, incorporated herein by reference.

Migrating a shot record Q(x, y; $x_s$, $y_s$; t), with the shot at ($x_s$, $y_s$, $z_s$=0) and the receivers at (x, y, z=0), requires computing the wavefields originating at the source location and observed at the receiver locations. Based on the source wavefield expanding with time and the recorded wavefield computed backward in time, the source wave field is denoted as $p_F$ and the recorded wavefield is denoted as $p_B$ in the equations:

$$\begin{cases} \left(\frac{1}{v^2}\frac{\partial^2}{\partial t^2} - \Delta\right) p_F(\vec{x}; t; \vec{x}_s) = 0, \\ p_F(x, y, z = 0; t; \vec{x}_s) = \delta(\vec{x} - \vec{x}_s)\int_{-\infty}^{t} f(t')dt', \end{cases} \quad (4)$$

and $$\begin{cases} \left(\frac{1}{v^2}\frac{\partial^2}{\partial t^2} - \Delta\right) p_B(\vec{x}; t; \vec{x}_s) = 0, \\ p_B(x, y, z = 0; t; \vec{x}_s) = Q(x, y; x_s, y_s; t), \end{cases} \quad (5)$$

where $v=v(\vec{s})$ is the velocity, f(t) is the source signature and $\Delta = \partial_x^2 + \partial_y^2 + \partial_z^2$ is the Laplacian operator.

Further, it can be shown that wave propagation equation (4) and wave propagation equation (5), when combined with the three dimensional imaging condition:

$$R(\vec{x}; \theta; \varphi) = \int \int \frac{v(\vec{x})}{\sin\theta'} \delta(\theta' - \theta)\delta(\varphi' - \varphi)p_B p_F dt d\vec{x}_s d\theta' d\varphi' \quad (6)$$

where $\theta$ is the reflection angle at the imaging location and $\varphi$ is the azimuth angle at the imaging location, provide AVA friendly migration amplitude in the subsurface angle domain as described by XU et. al. It should be noted that the previously described RTM theory ignores the effects of ghosts.

Looking now to an embodiment, based on propagating an artificial wavefield in RTM, it is straightforward to compensate for the source ghost during the migration. Achieving the source ghost compensation in an embodiment involves modifying equation (4) to:

$$\hat{p}_F(x, y, z = 0; \omega; \vec{x}_s) = \delta(\vec{x} - \vec{x}_s)\frac{f(\omega)}{i\omega G_s(\omega, \alpha_s)}, \quad (7)$$

where $\hat{p}_F(\omega)$ represents the Fourier transform of $p_F(t)$. Similarly, the same concept can be applied in an embodiment for receiver ghost compensation with the equation:

$$\hat{p}_B(x, y, z = 0; \omega; \vec{x}_s) = \frac{Q(x, y; x_s, y_s; \omega)}{G_r(\omega, \alpha_r)}. \quad (8)$$

However, it should be noted in the embodiment that when seismic data is aliased, applying receiver ghost compensation equation (8) directly can cause instability, so a regularization remedy can be applied during wave propagation.

According to an embodiment, RTM can be used to estimate velocity and/or impedance perturbations. Consider the acoustic equation with both velocity $v(\vec{x})$ and density $\rho(\vec{x})$ variations as follows:

$$\left(\frac{1}{v^2}\frac{\partial^2}{\partial t^2} - \rho\nabla\cdot\frac{1}{\rho}\nabla\right)p(\vec{x}; t; \vec{x}_s) = \delta(\vec{x} - \vec{x}_s)\sigma(t). \quad (9)$$

For given initial velocity $v_0(\vec{x})$ and density $\rho_0(\vec{x})$ models, the perturbed wavefield $\delta p(\vec{x}; t; \vec{x}_s) = p - p_0$ satisfies the following equation:

$$\left(\frac{1}{v_0^2}\frac{\partial^2}{\partial t^2} - \rho_0\nabla\cdot\frac{1}{\rho_0}\nabla\right)\delta p(\vec{x}; t; \vec{x}_s) = \left(\frac{2\delta v}{v_0^3}\frac{\partial^2}{\partial t^2} - \left(\nabla\frac{\delta\rho}{\rho_0}\right)\cdot\nabla\right)p_0(\vec{x}; t; \vec{x}_s), \quad (10)$$

where $\delta v = v - v_0$ and $\delta\rho = \rho - \rho_0$ denote the velocity and density perturbations, respectively. Using the method developed in Jin et al. (1992) and Forgus and Lambare (1997), the ray-based relation between the perturbed geological models and wavefield can be obtained as:

$$\frac{\delta v}{v_0} + \cos^2\theta\frac{\delta\rho}{\rho_0} = \quad (11)$$

$$32\pi \int \int \int \frac{v_0(\vec{x})}{\sin\theta'}\cos^2\theta'\frac{\cos\alpha_s}{v_0(\vec{x}_s)}\frac{\cos\alpha_r}{v_0(\vec{x}_r)}A_s S_r e^{-i\omega(\tau_s + \tau_r)}Q$$

$$\delta(\theta' - \theta)d\vec{x}_r d\vec{x}_s d\omega d\theta',$$

where $A_s(A_r)$ is the amplitude of the Green's function from the source (receiver) to the image point, $\tau_s(\tau_r)$ is the traveltime between the source (receiver) and the image point. In the context of RTM, equation (11) can be rephrased by modifying the imaging condition set forth in equation (6) as follows:

$$\sin^2\theta\frac{\delta v}{v} + \cos^2\theta\frac{\delta(v\rho)}{v\rho} = \quad (12)$$

-continued $$\int\int\int\int \frac{v(\vec{x})}{\sin\theta'}\cos^2\theta'\delta(\theta'-\theta)\frac{\hat{p}_B(\omega)\overline{\hat{p}}_F(\omega)}{i\omega}d\vec{x}_rd\vec{x}_sd\omega d\theta'.$$

Equation (12) indicates that if subsurface angle gathers are output with a proper imaging condition, the near angle images predict the impedance perturbation ($\delta(v\rho)/(v\rho)$), while the far angle images can be used to estimate the velocity perturbation ($\delta v/v$). Therefore, these embodiments separate the effects of velocity and density on the stacked image by outputting angle domain CIGs.

Figure 3:
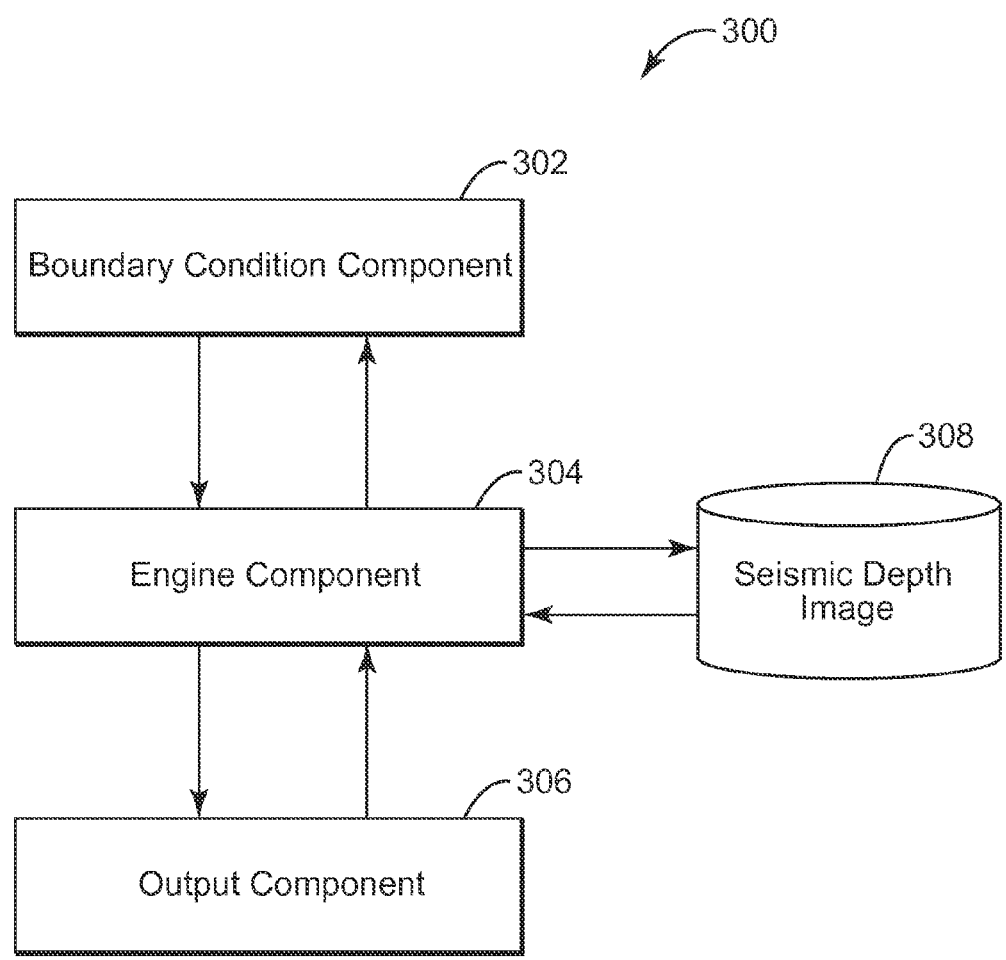
FIGS. 3-6 show various aspects of software components or modules which can be used to implement the embodiments.

Looking now to FIG. 3, a schematic diagram of an embodiment node 300 for compensating for source and receiver ghosts effects in RTM acoustic wave equations is depicted. The node 300 comprises a boundary condition component 302, an engine component 304, an output component 306 and a seismic dataset 308. Continuing with the embodiment, the boundary condition component 302 provides the ability to modify the boundary condition of the RTM acoustic wavefield equations as previously described. It should be noted in the embodiment that the boundary condition modification is based on a Fourier transform of the source and receiver wavefields. Further in the embodiment, it should be noted that modifying the boundary condition of the receiver wavefields of the RTM equation may introduce instability to the RTM equation requiring stabilization.

Next in the embodiment of the node 300, the engine component 304 provides the ability to solve the boundary conditioned modified RTM equations in light of the selected seismic dataset 308. It should be noted in the embodiment of node 300 that a reliable amplitude and spectrum response of RTM is generated after compensating for the ghost effects. Next in the embodiment of node 300, the output component 306 provides the capability to output the ghost compensated seismic depth image from RTM for analysis related to resource exploration. It should be noted in the embodiment that the ghost compensated amplitude and spectrum response of RTM that the low frequency geological variation is better delineated in the output computed seismic image.

Figure 4:
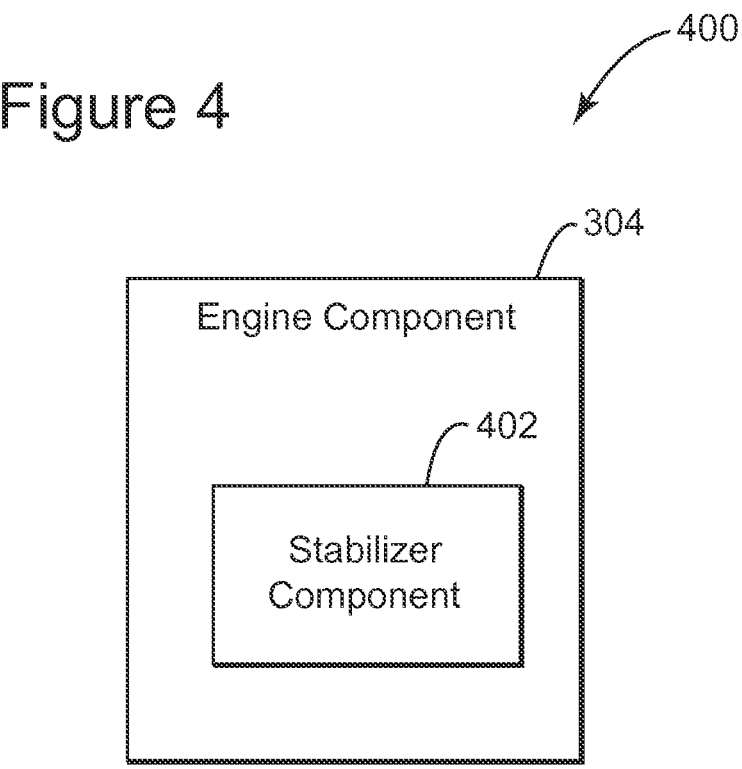

Next in the embodiment, with reference to FIG. 4, a schematic diagram 400 of an engine component 304 of a node 300 is depicted. The engine component 304 further comprises a stabilizer component 402 for stabilizing an RTM acoustic wave equation associated with aliased seismic data. It should be noted in the embodiment that the stabilization is based on a regularization remedy and is applied during the wave propagation.

Figure 5:
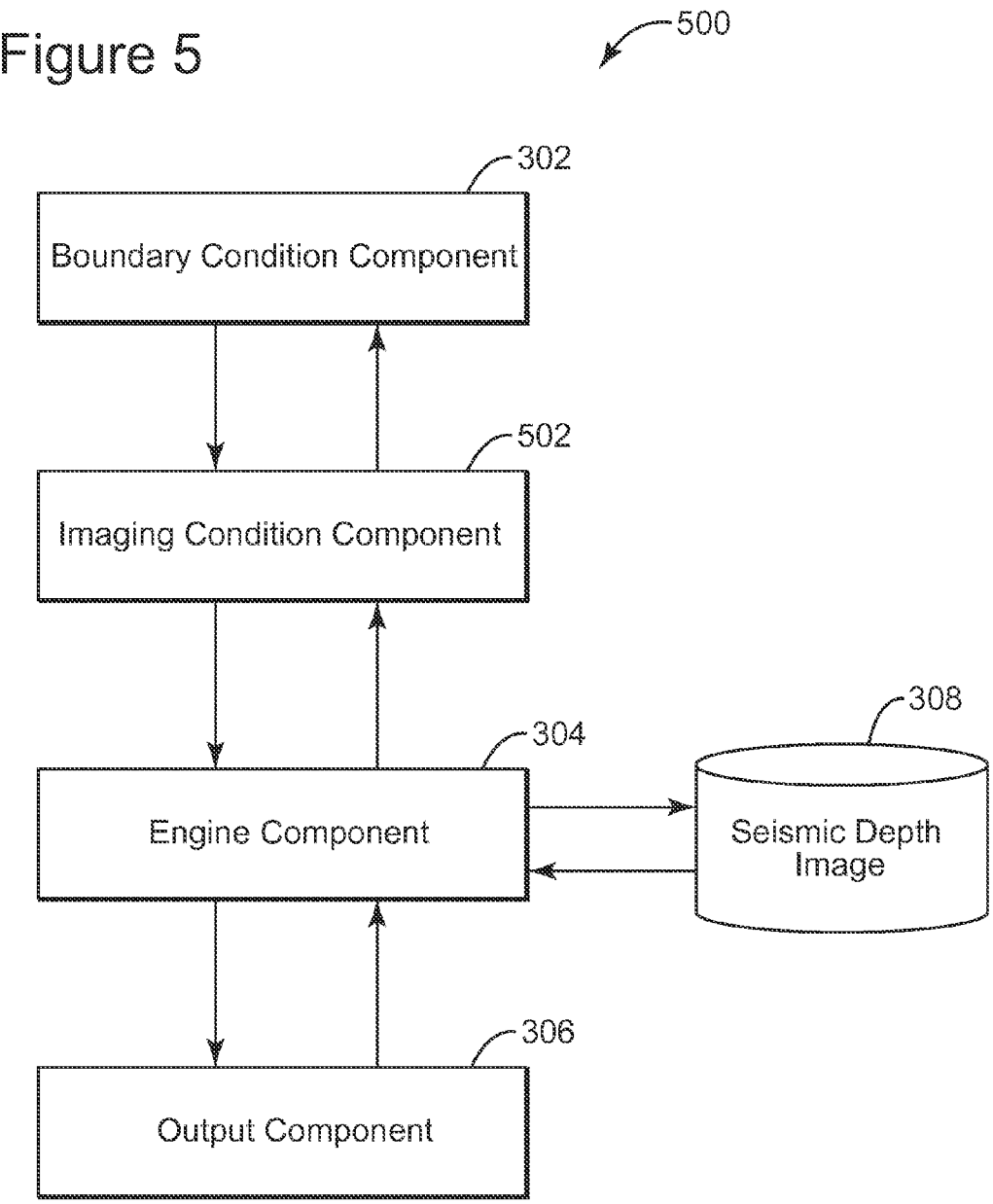

Looking now to FIG. 5, a schematic diagram of an embodiment of a node 500 for compensating for source and receiver ghosts effects in RTM acoustic wave equations and for generating velocity and impedance perturbation images is shown. The node 500 comprises a boundary condition component 302, an engine component 304, an output component 306 and a seismic dataset 308 as previously described. The node 500 further comprises an imaging conditioning component 502 for providing the ability to modify the imaging boundary condition of the RTM acoustic wavefield equations as previously described.

Figure 6:
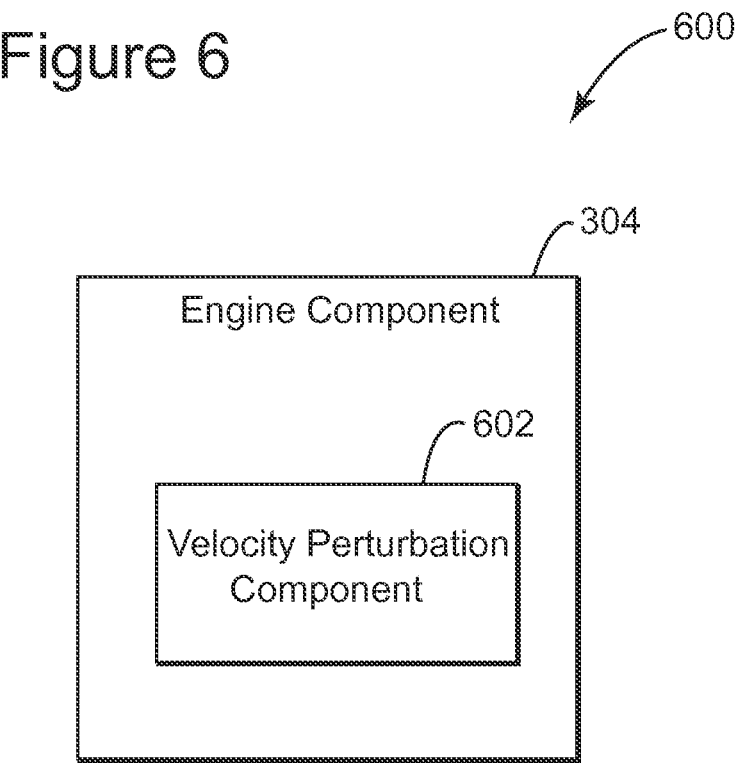

Continuing with the embodiment, in FIG. 6, a schematic diagram 600 of an engine component 304 of a node 500 is depicted. The engine component 304 further comprises a velocity and impedance perturbation component 602 for estimating velocity and impedance perturbations associated with the seismic dataset 308 based on solving the RTM acoustic wavefield equations. It should be noted in the embodiment that velocity and impedance perturbations and ghost compensation can occur simultaneously.

Figure 7:
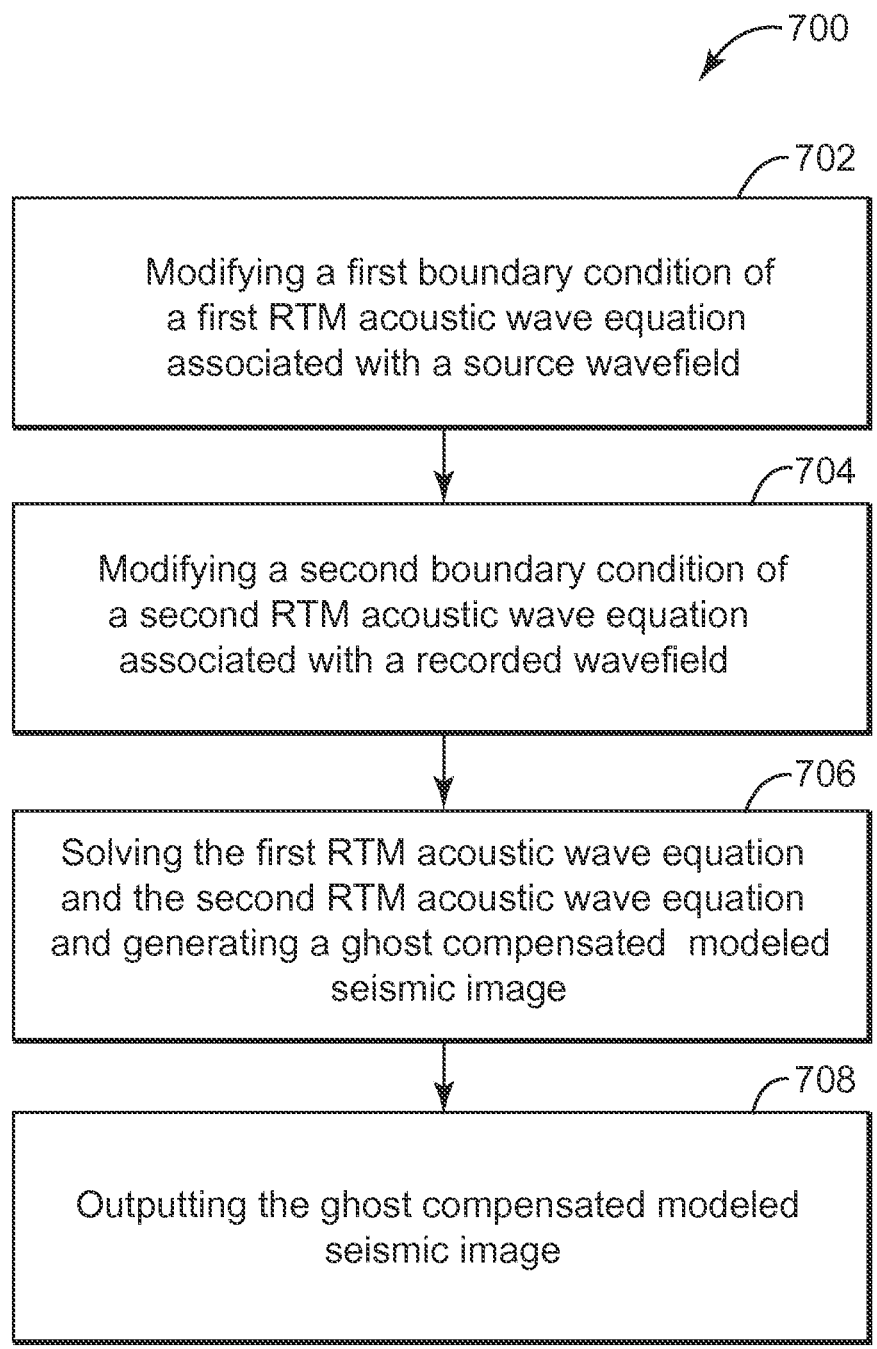
FIG. 7 is a flowchart depicting a method of generating a ghost compensated computed seismic image.

Looking now to FIG. 7, a method embodiment 700 of compensating for ghosts in a computed seismic image based on RTM of a seismic dataset associated with one or more seismic sources and one or more seismic receivers is depicted. Starting at step 702, the method embodiment 700 modifies a first boundary condition of a first RTM acoustic wave equation. In another aspect of the method embodiment 700 step 702, the acoustic wave equation is associated with a source wavefield. Next, at step 704, the exemplary method embodiment 700 modifies a second boundary condition of a second RTM acoustic wave equation. In another aspect of the method embodiment 700, at step 704, the acoustic wave equation is associated with a receiver wavefield.

Continuing at step 706 of the method embodiment 700, the boundary condition modified RTM acoustic wave equations are solved. In another aspect of step 706 of the method embodiment 700, a ghost compensated computed seismic image is generated. Next at step 708 of the method embodiment 700, the ghost compensated computed seismic image associated with the seismic dataset is output.

Figure 8:
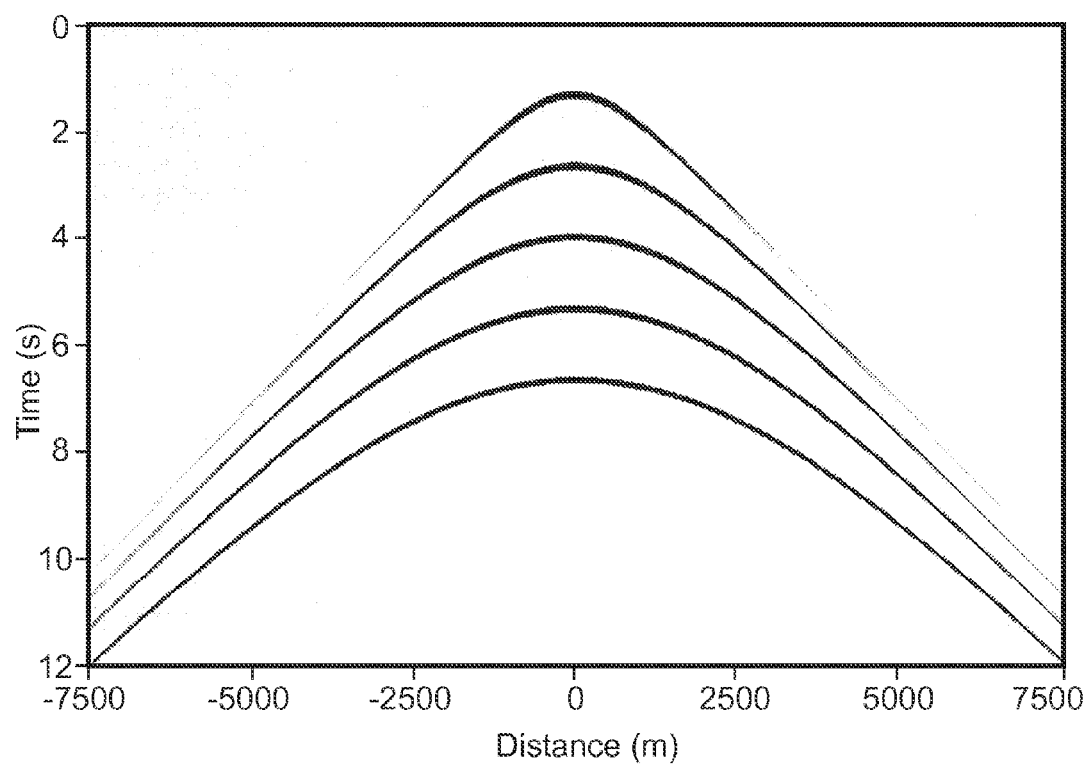
FIG. 8 is a graphic depiction of a shot record.
Figure 9A:
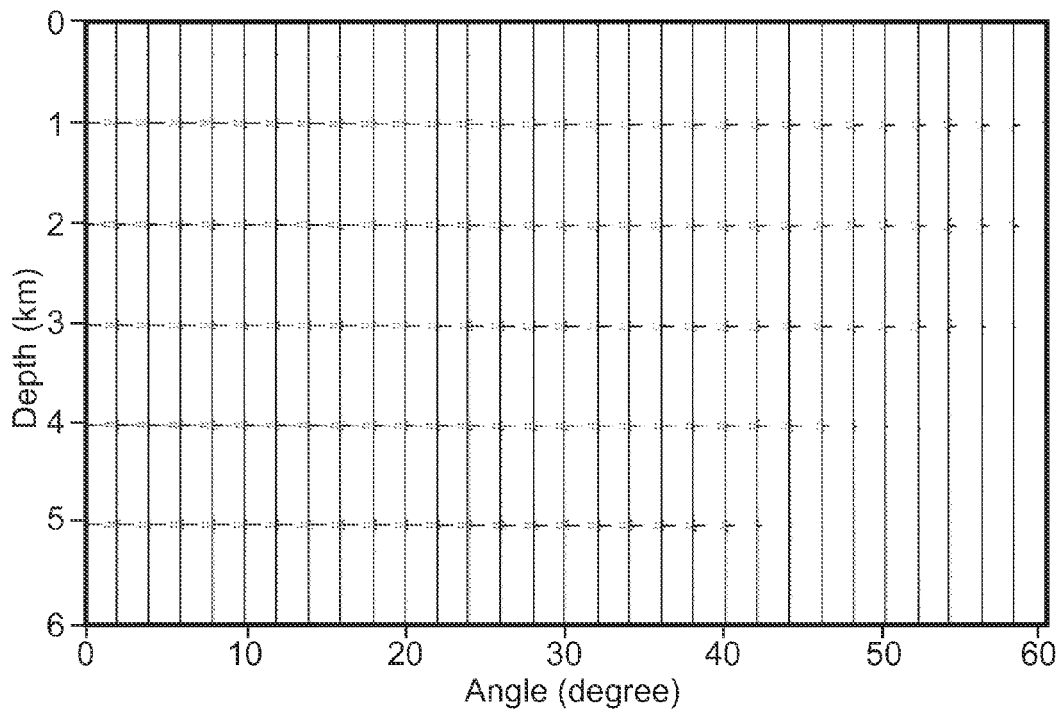
FIG. 9a is a graphic depiction of a migrated angle domain CIG.
Figure 9B:
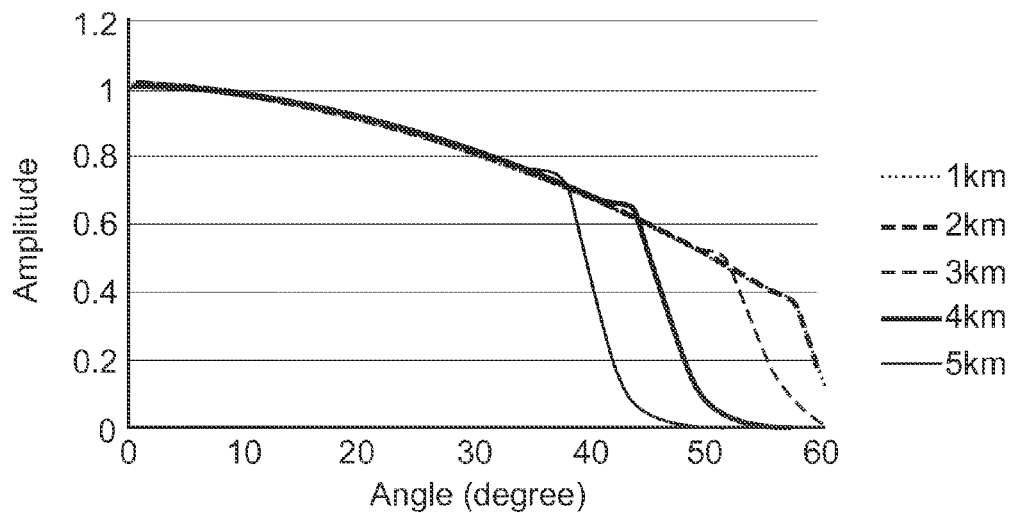
FIG. 9b is a graphic depiction of the associated AVA curves and FIGS. 9c and 9d show the ghost compensated equivalents.

An example is provided to show the reliable amplitude and spectrum response of RTM after compensating for the ghost effects according to the foregoing embodiments. It is assumed for this example that both the source and the receiver ghosts are recorded. FIG. 8 shows a two-dimensional single shot record over five horizontal reflectors at different depths, with the shot in the center of the section and the receivers out to an offset of 7500 meters on either side. The shot and the receiver depth are 10 meters and 15 meters, respectively, and the water velocity is 1500 meters per second. In the modeling, it is assumed that the reflectivity is uniform at all reflection points over all reflection angles. Due to the existence of ghosts, both the wavelet amplitude and spectrum are distorted across travel time and lateral distance, in addition to the effect of geometrical spreading. Using the conventional true amplitude RTM formulation equation (4) and equation (5), stacking all the migrated common image shot gathers to generate subsurface offset gathers, and then converting them to subsurface angle domain common image gathers (CIGs), as shown in FIG. 9, the result is a distortion in the spectrum of the migrated image (FIG. 9a) and an incorrect AVA trend (FIG. 9b).

Figure 9C:
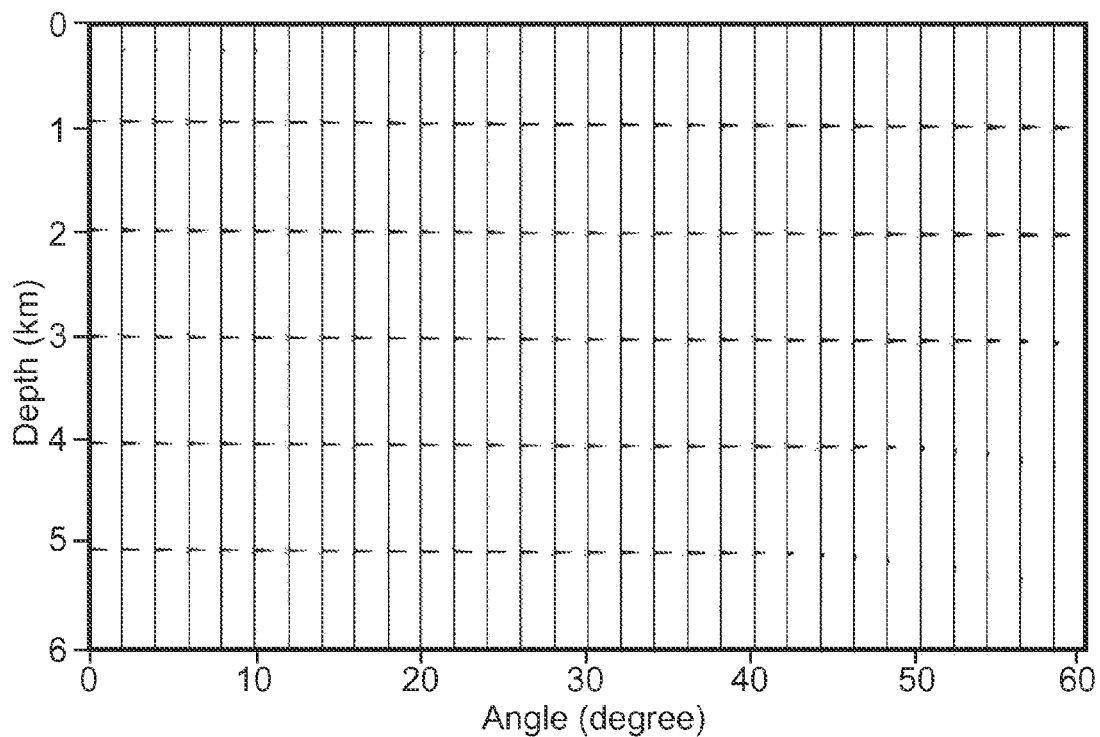
Figure 9D:
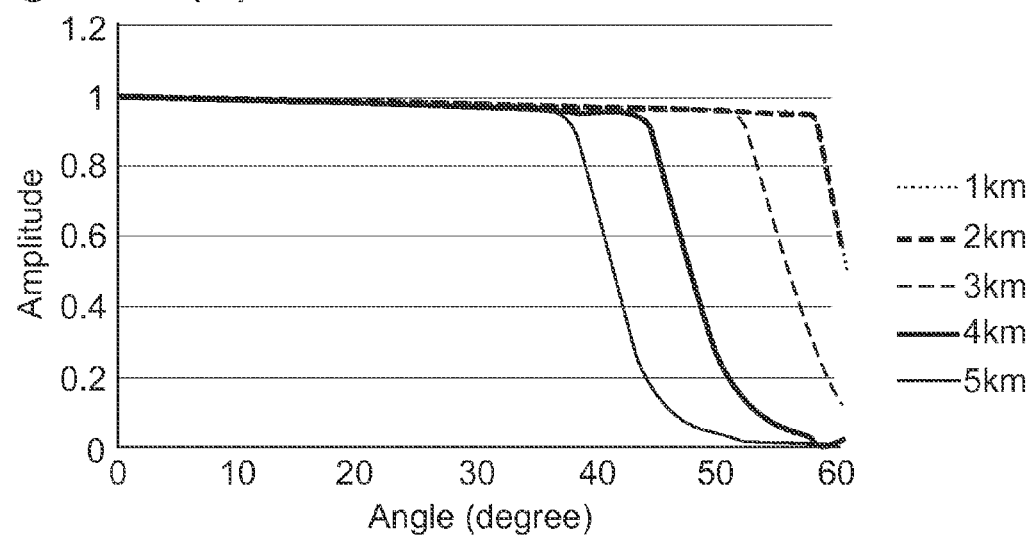

After compensating for the ghost effects on both source and receiver sides, the wavelets on the migrated angle gather have wider and more balanced frequency bandwidth and appear much sharper (FIG. 9c). Also, the normalized peak amplitudes along reflectors in the reflection angle domain converge well which indicates the reflectivity is well recovered and the AVA relation is more reliable (FIG. 9d).

Figure 10:
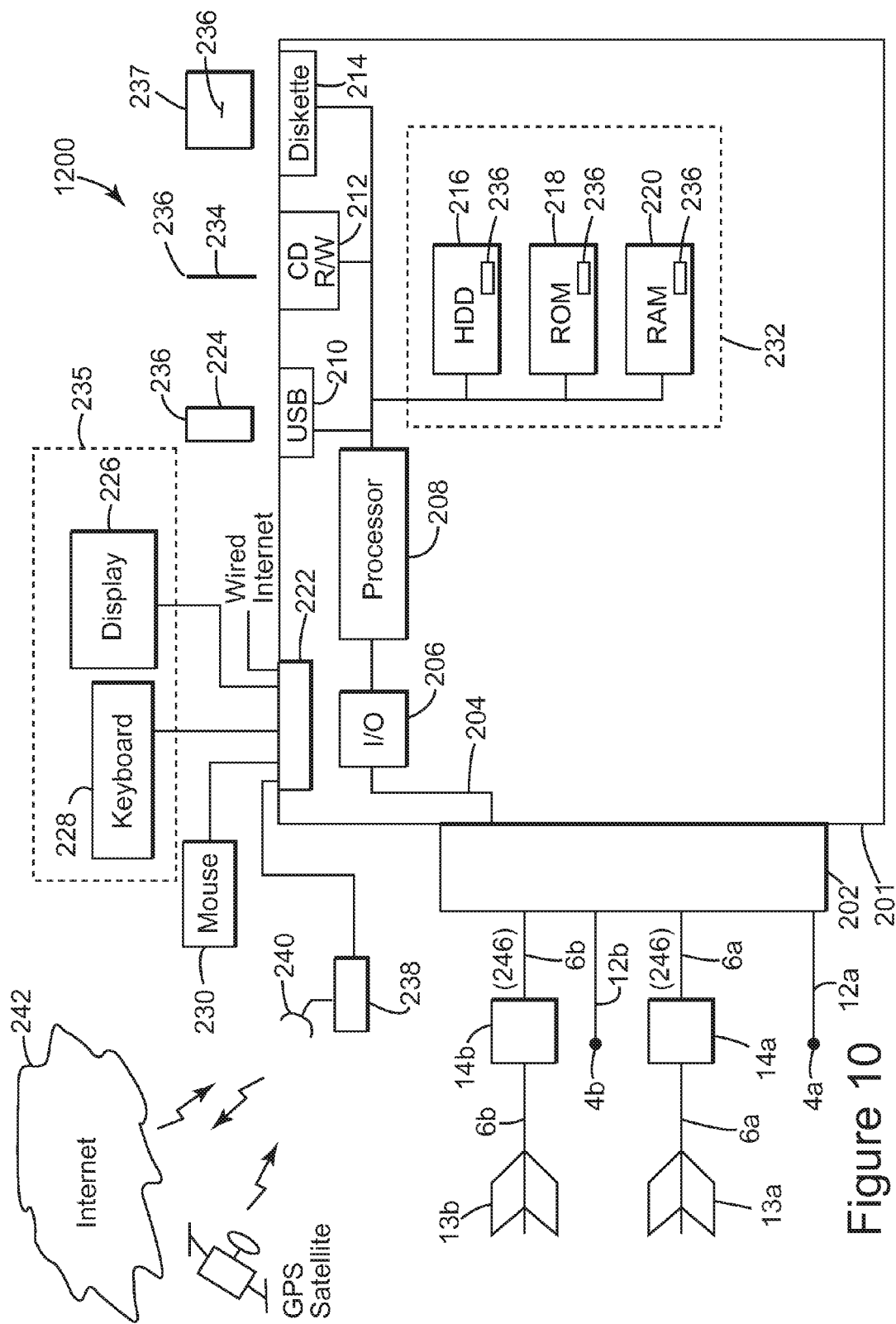
FIG. 10 illustrates an exemplary data processing device or system which can be used to implement the embodiments.

The computing device(s) or other network nodes involved in ghost compensated modeled seismic image prediction as set forth in the above described embodiments may be any type of computing device capable of processing and communicating seismic data associated with a seismic survey. An example of a representative computing system capable of carrying out operations in accordance with these embodiments is illustrated in FIG. 10. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 235, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being designed for use in seismic exploration, will interface with one or more sources 4*a,b* and one or more receivers 14. These, as previously described, are attached to streamers 6*a,b*, to which are also attached birds 13*a,b* that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further exemplary embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 246 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 246 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with ghost compensated modeled seismic image prediction according to an exemplary embodiment. Hardware, firmware, software or a combination thereof may be used to perform the various steps and operations described herein. According to an exemplary embodiment, software 236 for carrying out the above discussed steps can be stored and distributed on multi-media storage devices such as devices 216, 218, 220, 224, 234, and/or 237 (described above) or other forms of media capable of portably storing information (e.g., universal serial bus (USB) flash drive 426). These storage media may be inserted into, and read by, devices such as the CD-ROM drive 414, the disk drive 412, among other types of software storage devices.

The disclosed exemplary embodiments provide a server node, and a method for ghost compensated computed seismic image prediction associated with seismic datasets. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executing on a processor, for compensating for ghosts in a computed seismic image based on a reverse time migration (RTM) of seismic data, said method comprising:
    obtaining the seismic data acquired with one or more seismic sources and one or more seismic receivers placed to explore an underground formation;
    modifying a first boundary condition of a first RTM acoustic wave equation associated with a source wavefield;
    modifying a second boundary condition of a second RTM acoustic wave equation associated with a recorded wavefield;
    solving said first RTM acoustic wave equation and said second RTM acoustic wave equation and generating a ghost compensated computed seismic image; and
    displaying said ghost compensated computed seismic image as a structural representation of the underground formation.

2. The method of claim 1, wherein input data used in the method in a shot domain.

3. The method of claim 1, wherein input data used in the method in a receiver domain.

4. The method of claim 1, wherein said first RTM acoustic wave equation is associated with said one or more seismic sources.

5. The method of claim 4, wherein a modified first boundary condition is $$\hat{p}_F(x, y, z = 0; \omega; \vec{x}_s) = \sigma(\vec{x} - \vec{x}_s) \frac{f(\omega)}{i\omega G_s(\omega, \alpha_s)}.$$

6. The method of claim 1, wherein said second RTM acoustic wave equation is associated with said one or more seismic receivers.

7. The method of claim 6, wherein a modified second boundary condition is $$\hat{p}_B(x, y, z = 0; \omega; \vec{x}_s) = \frac{Q(x, y; x_s, y_s; \omega)}{G_r(\omega, \alpha_r)}.$$

8. The method of claim 6, further comprising stabilizing said second RTM acoustic wave equation for aliased seismic data.

9. The method of claim 8, wherein said stabilization is based on a regularization remedy applied when said aliased seismic data produces instability in said second RTM acoustic wave equation.

10. The method of claim 1, further comprising modifying an imaging condition associated with said second RTM acoustic wave equation.

11. The method of claim 10, wherein said imaging condition is $$\sin^2\theta \frac{\delta v}{v} + \cos^2\theta \frac{\delta(v\rho)}{v\rho} = $$

$$\iiiint \frac{v(\vec{x})}{\sin\theta'} \cos^2\theta' \delta(\theta' - \theta) \frac{\hat{p}_B(\omega)\overline{\hat{p}_F(\omega)}}{i\omega} d\vec{x}_r d\vec{x}_s d\omega d\theta'.$$

12. The method of claim 11, wherein said solving said second RTM acoustic wave equation generates a velocity and impedance perturbation image.

13. The method of claim 12, wherein said outputting further comprises outputting said velocity and impedance perturbation image.

14. A node for compensating for ghosts in seismic image data based on a Reverse Time Migration (RTM), said node comprising:
    a seismic dataset acquired with one or more seismic sources and one or more seismic receivers placed to explore an underground formation;
    one or more processors configured to execute computer instructions and a memory configured to store said computer instructions wherein said computer instructions further comprise:
        a boundary condition component for modifying boundary conditions associated with RTM acoustic wave equations;
        an engine component for solving said RTM acoustic wave equations configured with modified boundary conditions and generating a ghost compensated modeled seismic image; and
        an output component for outputting said ghost compensated modeled seismic image; and
    a display configured to display the ghost compensated image as a structural representation of the underground formation.

15. The node of claim 14, wherein said engine component further comprises a stabilization component for applying a regularization remedy during an RTM computation.

16. The node of claim 14, further comprising an imaging condition component for modifying imaging conditions associated with RTM acoustic wave equations.

17. The node of claim 16, wherein said engine component further comprises a velocity and impedance perturbation component for generating velocity and impedance perturbation images.

18. The node of claim 17, wherein said output component is configured to output said velocity and impedance perturbation images.

19. The node of claim 17, wherein said output component is configured to simultaneously output said ghost compensated modeled seismic images and said velocity and impedance perturbation images.

20. The node of claim 15, wherein said stabilization component is configured to apply said regularization remedy whenever instability is detected in an RTM acoustic wave equation associated with a recorded wavefield.

* * * * *